C. M. CRESSON.
Process for Separating Fats.
No. 164,907.
Patented June 29, 1875.
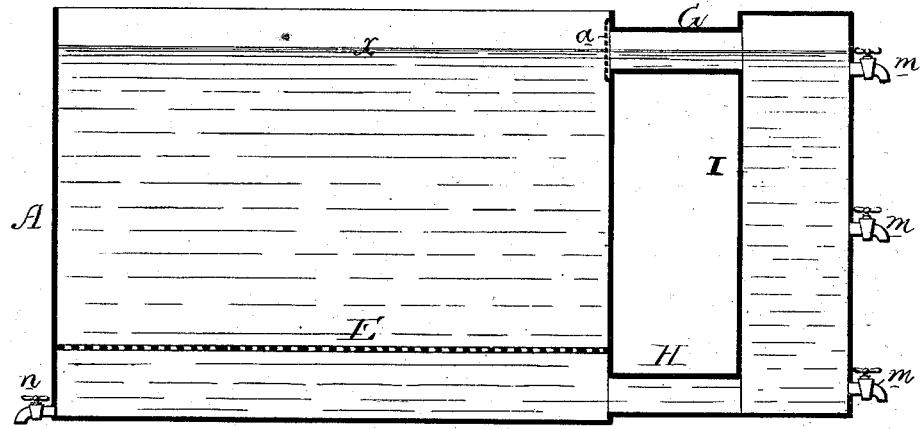
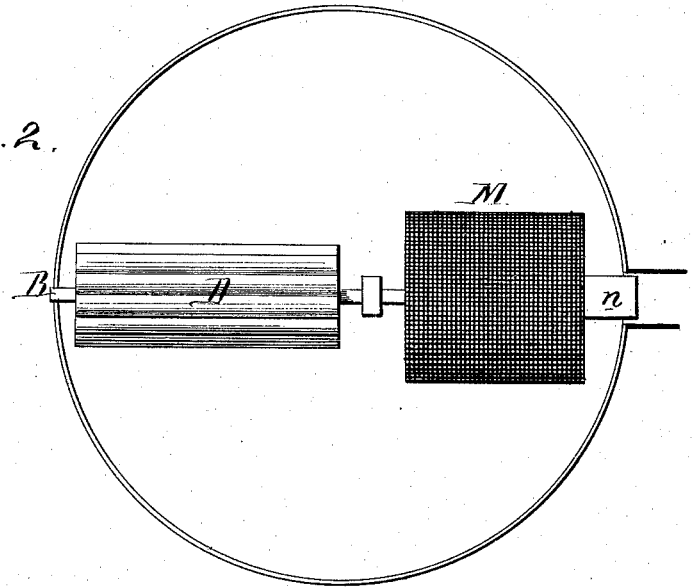
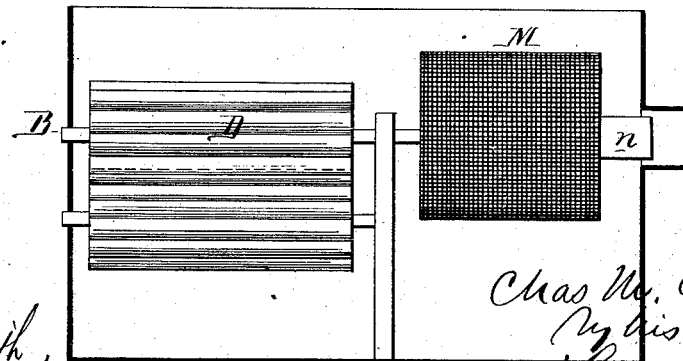
Witnesses,
Harry Smith
Thos. McIlvain
Chas. M. Cresson M.D.
By his Atty's
Howson and Son

UNITED STATES PATENT OFFICE.

CHARLES M. CRESSON, OF PHILADELPHIA, PENNSYLVANIA, ASSIGNOR TO ROBERT P. DECHERT, TRUSTEE, OF SAME PLACE.

IMPROVEMENT IN PROCESSES FOR SEPARATING FATS.

Specification forming part of Letters Patent No. 164,907, dated June 29, 1875; application filed June 1, 1874.

*To all whom it may concern:*

Be it known that I, CHARLES M. CRESSON, M. D., of Philadelphia, Pennsylvania, have invented a Process of and Apparatus for Separating Fats, of which the following is a specification:

The object of my invention is the separation of fats and oils into their component parts without any destructive chemical action or the production of secondary products; and this object I attain by convective currents of warm liquids at such low temperatures (always below the boiling-point of water) as the character of the fat to be separated may demand.

The apparatus in its simplest form is represented in the vertical section, Figure 1, of the accompanying drawing, in which—

A and I are two vessels communicating with each other through pipes G and H. Water or other suitable liquid is maintained in the vessel at the level indicated by the line $x$, and is heated by a steam-coil or otherwise, so that it can be made to flow continuously through the pipe G into the vessel I, and thence, through the pipe H, back to the vessel A, and this circulation of water may be accelerated by means of a pump so arranged in respect to the pipe H that it will force the liquid through the same into the vessel A.

The fat to be operated on is placed in the vessel A, and for delicate separation it may be inclosed in a bag of coarse fabric and weighted down upon a perforated plate, E, by means of another perforated plate; but for most purposes the fat may be roughly chopped up and allowed to float in the liquid in the vessel. A screen, $a$, of from thirty to eighty meshes to the inch, is placed within the vessel A at at the entrance of the pipe G, and through this screen the melted portions of the fat will be conveyed into the vessel I, where they will remain floating on the liquid until the said vessel I is so charged with the melted fat that the latter will pass into the vessel A to the unmelted fat. In order to prevent this, either the vessel A must be of sufficient capacity to contain all the fat to be separated, or the melted fat can be drawn off from the vessel I from time to time through any of the cocks $m$ $m$ $m$.

In using the apparatus the following instructions should be observed: After the vessel A has been filled with liquid to the height indicated by the line $x$, and the fat has been placed in the vessel, heat the whole mass gradually for, say, one or two hours, either by the application of heat to the outside of the vessel, or by steam, or hot-air, or hot-water coils within the vessel, until the temperature is reached at which that component part of the fat which has to be separated melts. After the contents of the vessel A have been thoroughly and equally heated, start the circulation either by cooling the vessel I or by some mechanical device. A cock in the pipe G, for instance, may be used for arresting or starting the circulation.

As before remarked, the melted fat will flow into the vessel I, from which it may be removed from time to time, while the blood, tissues, and other residuum will settle on the bottom of the vessel A, and can be withdrawn therefrom from time to time through a cock, $n$.

It should be understood that the object aimed at is the separation of fats and oils into their component parts by liquid at such a temperature (always below the boiling-point of water) as will attain the object without destructive chemical action or the production of secondary products.

Different temperatures will be required for separating fats for different purposes; for instance, fats separated at a temperature not exceeding 105° are suitable for pomades, butters, or lubricants. Fats separated at a temperature of 115° to 145° may be used for hard pomades or soaps, and those separated at a temperature above 170° for candles.

It will be found that fats, even from the same class of animals, vary very much in constitution and in the relative quantity of products which may be extracted.

In the modification of the apparatus shown in the plan view, Fig. 2, and sectional view, Fig. 3, a shaft, B, has one bearing in the side of the vessel and another in a post projecting from the bottom of the said vessel, and this shaft carries a fluted roller, D, and a like roller turns below the fat, at and near the surface of the liquid, whereby the fat is kneaded, so as to facilitate the operation of melting. In this modification, too, instead of the permanent screen $a$, (shown in Fig. 1,) I attach to the shaft B a cylindrical screen, the tubular end $n$ of which turns in the entrance to the pipe G. The constant rotation of the screen will prevent that clogging of its meshes to which a stationary screen would be liable.

It may be remarked that I prefer water as a fluid through the medium of which the fat should be melted.

I claim as my invention—

The within-described process of separating fats and oils into their component parts—that is to say, by means of convective currents of warm liquid at such low temperatures as will insure the separation of the component part of the fat desired without destructive chemical action, and without producing secondary products, as set forth.

In testimony whereof I have signed my name to this specification in the presence of two subscribing witnesses.

CHARLES M. CRESSON, M. D.

Witnesses:
  H. HAUPT, Jr.,
  WM. A. STEEL.